United States Patent Office 3,515,787
Patented June 2, 1970

3,515,787
COMPOSITIONS AND METHODS FOR PRODUCING A MUSCLE RELAXING EFFECT IN AN ANIMAL WITH 2,3 - SUBSTITUTED - 6 - AMINO-4-QUINAZOLONES
Hermann Breuer, Hans Hoehn, and Egon Roesch, Regensburg, Germany, assignors, by mesne assignments, to E. R. Squibb & Sons, Inc., New York, N.Y., a corporation of Delaware
No Drawing. Original application Dec. 16, 1964, Ser. No. 418,909, now Patent No. 3,414,573, dated Dec. 3, 1968. Divided and this application Sept. 15, 1967, Ser. No. 679,274
Int. Cl. A61k 27/00
U.S. Cl. 424—251
8 Claims

ABSTRACT OF THE DISCLOSURE

This invention relates to new quinazolone derivatives of the formula

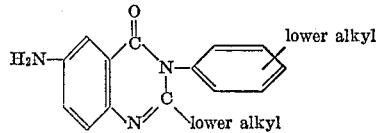

to acid addition salts thereof and to compositions containing them. The compounds are produced by catalytic reduction of the corresponding nitro, nitroso, acylamino or benzylamino compounds. The compositions are useful as sedatives, hypnotics, anticonvulsants and especially as muscle relaxants.

---

This application is a division of application Ser. No. 418,909, filed Dec. 16, 1964 and now U.S. Pat. No. 3,414,573 issued Dec. 3, 1968, which is a continuation-in-part of application Ser. No. 282,223, filed May 22, 1963, and now abandoned.

This invention relates to quinazolone derivatives. More particularly the invention relates to new quinazolones having the structural formula (I)
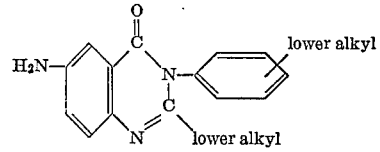

and acid addition salts thereof.

The lower alkyl groups include straight and branched chain saturated hydrocarbon groups such as methyl, which is preferred, ethyl, propyl, isopropyl, butyl, isobutyl, t-butyl, amyl and the like.

The compounds of Formula I are weak bases which form acid addition salts, especially with inorganic acids. Such salts include for example hydrohalides such as hydrochloride, hydrobromide, etc., sulfates, nitrates and the like. These salts are useful in isolating the product.

The compounds of Formula I are produced from compounds of the formula (II)
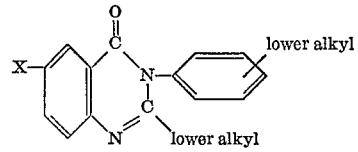

wherein X represents a substituent which may be converted into a free amino group. By substituents which may be converted into the amino group are meant those groups which, for instance by reduction or by hydrolysis give the amino group, e.g., nitro, nitroso, acylamino or benzylamino groups.

According to a preferred modification, the compounds of Formula I are produced by the reduction of a nitro group (X in Formula II=$NO_2$) with catalytically activated hydrogen.

The new compounds of the invention have useful therapeutic properties and may be used as sedatives, hypnotics, anticonvulsants and especially as muscle relaxants for which they are particularly effective. They may be administered in single doses of 25 to 150 mg. preferably 50 to 100 mg., or divided daily doses totalling 75 to 600 mg., preferably 150 to 300 mg. per day. The compounds of Formula I or pharmaceutically acceptable acid addition salts thereof may be administered orally or parenterally in conventional dosage forms such as tablets, capsules, injectables and the like. Thus they may be administered orally in the form of tablets or capsules containing excipients such as lactose, starch, alginate or the like, or in the form of elixirs or oral suspensions. They may be administered intramuscularly or intravenously as solutions in water miscible solvents such as glycerol, formal or polyethylene glycol.

In tests for muscle relaxant activity conducted in rats and mice by the inclined screen procedure as described by Thompson, Endocrinology 39, 62 (1949) and modified for mice by Hoppe, Journal of Pharmacology and Experimental Therapeutics 100, 333 (1950), respective members of Formula I were found to have $ED_{50}$ (effective dose) values in the range 14 to 47 mg./kg., $LD_{50}$ (lethal dose) values in the range 60 to 285 mg./kg. and therapeutic ratios ($LD_{50}/ED_{50}$) in the range 2.1 to 7.1.

The following examples are illustrative of the invention. All temperatures are in degrees centigrade.

EXAMPLE 1

14 grams of 2-methyl-3-o-tolyl-6-nitro-4-quinazolone are suspended in 400 ml. of ethyl acetate and the suspension is catalytically hydrogenated in the presence of Raney nickel. As the hydrogen uptake draws to an end, the product begins to crystallize out. After warming gently, the catalyst is separated by filtration and the filtrate is concentrated to a small volume. The precipitated crystals are separated by filtering under suction. The product, 2-methyl-3-o-tolyl-6-amino-4-quinazolone is recrystallized from ethanol, M.P. 223–224°.

2-methyl-3-o-tolyl-6-nitro-4-quinazolone is prepared as follows: A solution of 22.4 grams of 5-nitro-N-acetyl-anthranilic acid and 11.8 grams of o-toluidine in 200 ml. of glacial acetic acid is warmed to a temperature of 100–110° and 13.7 grams of phosphorus trichloride added dropwise with stirring. The mixture is then stirred for an additional two hours at 110°. The acetic acid is distilled off in vacuo until crystallization begins. The mixture is cooled and the hydrochloride of 2-methyl-3-o-tolyl-6-nitro-4-quinazolone is filtered under suction. The free base is obtained by treating the hydrochloride with dilute sodium hydroxide solution. The product is recrystallized from ethanol, M.P. 184–185°.

EXAMPLE 2

By substituting 2-ethyl-3-o-tolyl-6-nitro-4-quinazolone for the 2-methyl-3-o-tolyl-6-nitro-4-quinazolone in the procedure of Example 1, 2-ethyl-3-o-tolyl-6-amino-4-quinazolone is obtained.

The following table lists additional compounds which are obtained by the procedure described in the foregoing examples.

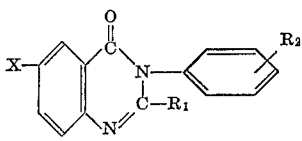

| $R_1$ | $R_2$ | X | M.P. (deg.) | M.P. of intermediate (X=NO₂) (deg.) |
|---|---|---|---|---|
| CH₃ | o-CH₃ | NH₂ | 223–24 | 182–83 |
| CH₃ | m-CH₃ | NH₂ | 235–36 | 154–55 |
| CH₃ | p-CH₃ | NH₂ | 179–80 | 222–23 |

EXAMPLE 3

Tablets of 380 mg. each and containing 100 mg. of active ingredient are prepared by conventional granulation technique from the following materials:

|  | Mg. |
|---|---|
| 2-methyl-3-o-tolyl-6-amino-4-quinazolone | 100 |
| Starch | 133 |
| Lactose | 100 |
| Sodium alginate | 26 |
| Talc | 11 |
| Agar | 6 |
| Polyvinyl pyrrolidone | 4 |

100 mg. of 2-methyl-3-p-tolyl-6-amino-4-quinazolone may be substituted as the active ingredient in the above formulation.

EXAMPLE 4

Ampules for intramuscular or intravenous injection are prepared from the following materials:

|  | G. |
|---|---|
| 2-methyl-3-o-tolyl-6-amino-4-quinazolone | 0.050 |
| Benzyl alcohol | 0.075 |
| Polyethylene glycol 300 | 2.5 |
| Distilled water q.s. 5.0 ml. | |

EXAMPLE 5

Vials for intramuscular or intravenous injection are prepared from the following materials:

|  | G. |
|---|---|
| 2-ethyl-3-o-tolyl-6-amino-4-quinazolone | 0.025 |
| Benzyl alcohol | 0.075 |
| Polyethylene glycol 300 | 2.5 |
| Distilled water q.s. 5.0 ml. | |

What is claimed is:
1. A therapeutic composition which comprises about 25 to 600 mg. of a member selected from the group consisting of a compound of the formula

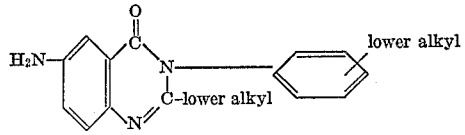

and a pharmaceutically acceptable acid addition salt thereof, and a pharmaceutically acceptable carrier therefor.

2. A therapeutic composition as in claim 1 containing 50 to 300 mg. of the active compound.

3. A therapeutic composition which comprises 50 to 150 mg. of 2-methyl-3-o-tolyl-6-amino-4-quinazolone and a pharmaceutically acceptable carrier therefor.

4. A therapeutic composition which comprises 50 to 200 mg. of 2-methyl-3-p-tolyl-6-amino-4-quinazolone and a pharmaceutically acceptable carrier therefor.

5. A therapeutic composition which comprises 25 to 75 mg. of 2-ethyl-3-o-tolyl-6-amino-4-quinazolone and a pharmaceutically acceptable carrier therefor.

6. The process of producing a muscle relaxant effect in an animal which comprises administering to said animal from 50 to 450 mg. of 2-methyl-3-o-tolyl-6-amino-4-quinazolone.

7. The process of producing a muscle relaxant effect in an animal which comprises administering to said animal from 50 to 600 mg. of 2-methyl-3-p-tolyl-6-amino-4-quinazolone.

8. The process of producing a muscle relaxant effect in an animal which comprises administering to said animal from 25 to 200 mg. of 2-ethyl-3-o-tolyl-6-amino-4-quinazolone.

References Cited

UNITED STATES PATENTS 3,060,098  10/1962  Becker _____ 424—251

ALBERT J. MEYERS, Primary Examiner

S. J. FRIEDMAN, Assistant Examiner